Sept. 23, 1969  C. G. ELLWANGER ET AL  3,468,435
TRANSFER MECHANISM WITH WORK ROTATING DEVICE
Filed April 18, 1968  3 Sheets-Sheet 3

_United States Patent Office_

3,468,435
Patented Sept. 23, 1969

3,468,435
TRANSFER MECHANISM WITH WORK ROTATING DEVICE
Charles G. Ellwanger, Howard I. Huscher, and Robert J. Payment, Rochester, N.Y., assignors to The Gleason Works, Rochester, N.Y., a corporation of New York
Filed Apr. 18, 1968, Ser. No. 722,317
Int. Cl. B23p *15/14;* B23q *7/00*
U.S. Cl. 214—1       11 Claims

ABSTRACT OF THE DISCLOSURE

A transfer mechanism for loading gear blanks onto the workholder of a gear cutting machine has a device to rotate the blank to bring a bolt hole thereof into register with a torque-bearing key on the workholder, with the surface of the hole in abutment with the key. The device includes a piston-operated rotary driver carrying a spring-backed drive pin which during rotation in one direction drops into a bolt hole in the blank and turns the blank to a position on the mechanism in which another of bolt hole thereof will register with the key. After the mechanism has placed the blank on the workholder, reverse rotation of the driver brings the surface of the hole against the key.

---

The present invention relates to a transfer mechanism for loading workpieces, for example gears, onto the workholder of a gear cutting machine or other machine tool, and relates particularly to means for so presenting the workpiece to the workholder that a bolt hole or other keyway therein is placed in abutment with a torque-bearing key on the workholder.

Patent No. 3,169,446 to H. J. Anderson et al., discloses a mechanism for loading ring gear blanks onto the workholder of a spiral bevel gear cutting machine, the blanks having a relatively large diameter bore gripped by the workholder, so that sufficient holding torque can be applied to prevent cutting forces from turning the blank on the workholder. These forces are especially large during rough cutting of the tooth slots. With hub-type gears having a small-diameter cylindrical surface gripped by the workholder, sufficient holding torque often cannot be applied, so that a torque-bearing key has been provided between the workholder and the blank. Heretofore the loading of such gears has been by hand since it has been necessary not only to place the blank on the workholder with the bolt hole or other keyway of the blank in register with the key on the workholder but also to make sure, prior to gripping of the blank by the workholder, that the torque-bearing surface of such keyway is in abutment with the key. Otherwise during the cutting operation the blank could turn in the workholder to the extent of the clearance between the key and keyway, resulting in tooth spacing or other error, and, sometimes, destruction of the cutter. This requirement of abutment of the key and keyway has been in conflict with the practical necessity, in mechanized loading, of providing a clearance between such elements as a key and keyway in order to accommodate manufacturing and machine alignment tolerances.

By the present invention a gear blank loading mechanism, substantially of the kind disclosed in the aforementioned patent, is provided with a device for (a) mechanically rotating the blank to bring a bolt hole or other keyway into such position on the mechanism that it will register, with adequate clearance, with a torque-bearing key on the workholder, and for then (b) after the blank has been placed on the workholder but prior to work-gripping action of the workholder, reversely rotating the blank to take up the clearance and bring the surface of the keyway into abutment with the key.

A preferred embodiment of the invention is shown in the accompanying drawings, wherein.

Figure 1:
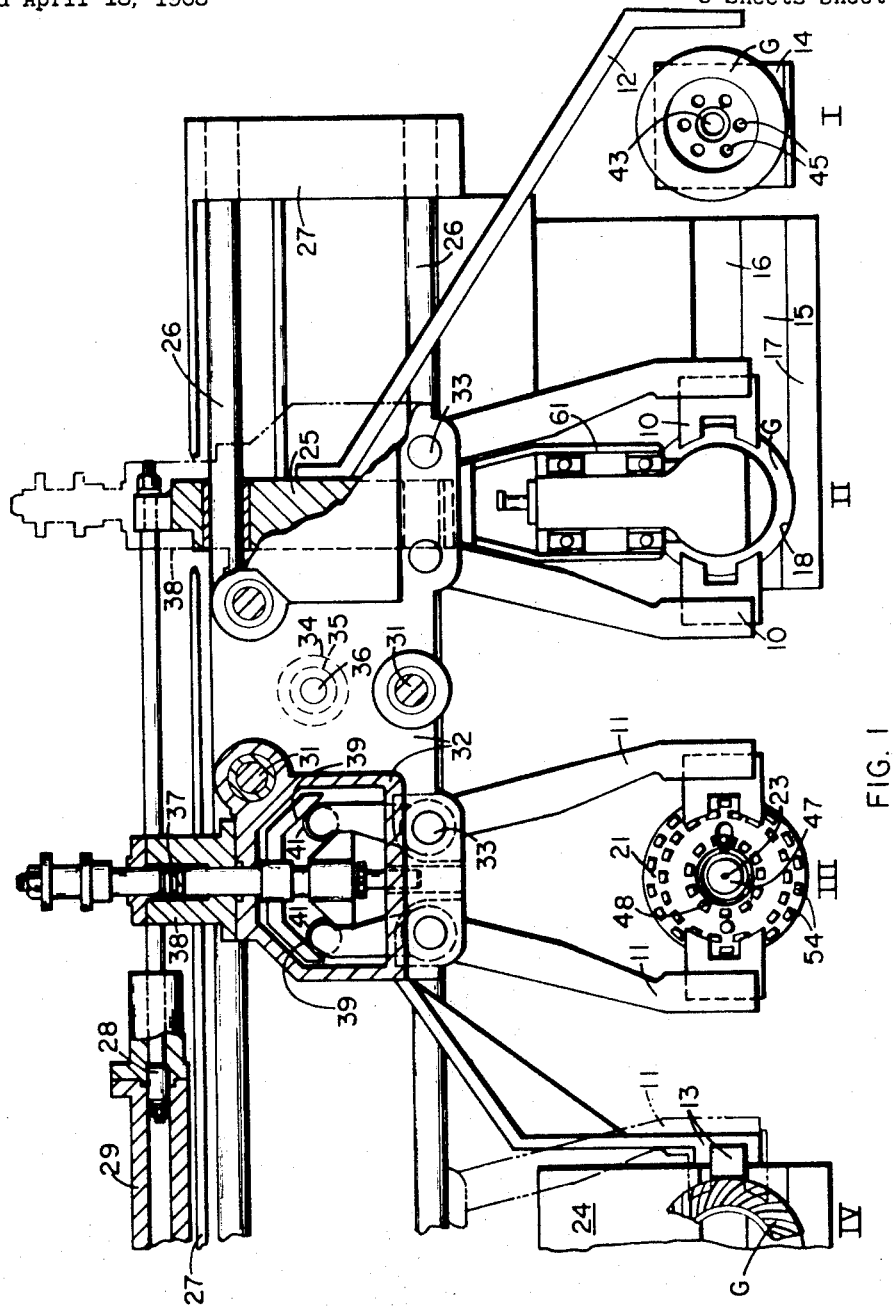
FIG. 1 is a face view, as seen looking downwardly at an angle of 45° from the horizontal, at the pertinent parts of the work transfer mechanism, with the device of the present invention applied thereto.
Figure 2:
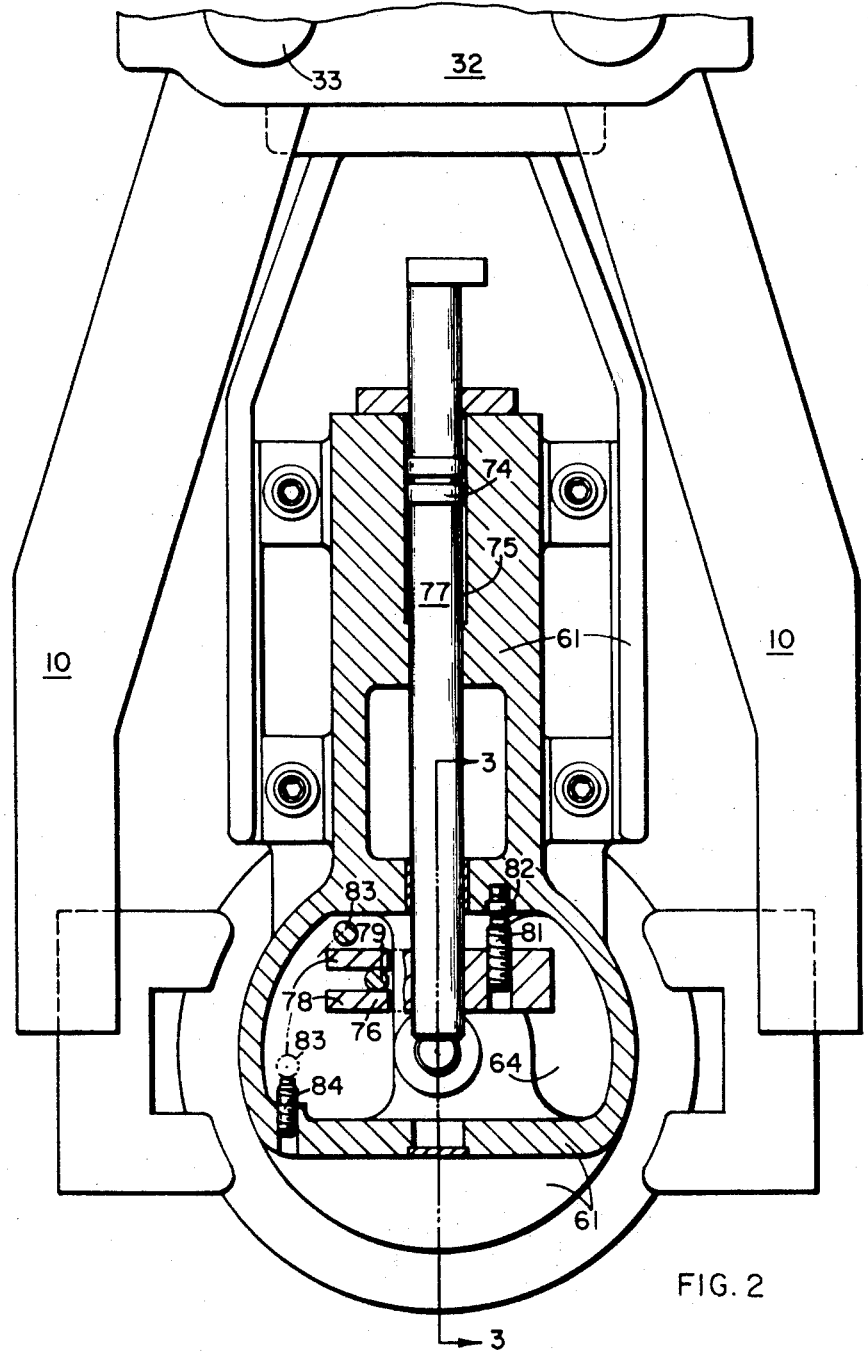
FIG. 2 is a view on a larger scale, partly in the section in the planes parallel to FIG. 1 indicated by section lines 2—2 in FIGS. 3 and 5.
Figure 3:
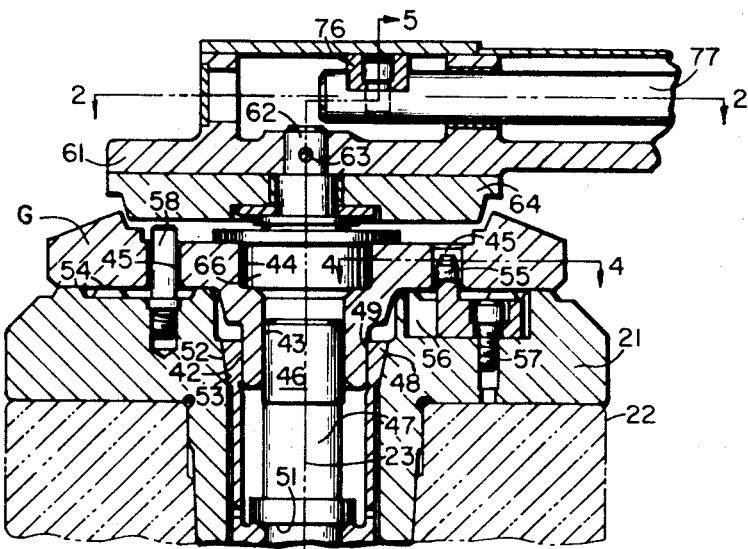
FIG. 3 is a section in plane 3—3 of FIG. 2.

The mechanism shown in FIG. 1 is similar to that shown in FIG. 3 of aforementioned Patent No. 3,169,446, being a work transfer mechanism with two sets of work-gripping jaws, 10 and 11, and two pushers, 12 and 13, adapted to successively carry a gear G from station I to station II by action of pusher 12, from station II to station III in jaws 10, from station III to station IV in jaws 11, and from station IV to a fifth station, not shown, by pusher 13. Station I is at a magazine 14 in which blanks G are advanced in succession into the transfer plane, i.e., the plane of FIG. 1, by movement of the magazine in a direction transverse of that plane. At station II is a support plate 15 upon which the back of the gear blank G may rest, the plate having a channel 16, into which the back hub of the gear blank may extend, and a bottom flange 17 along which the blank may be rolled by pusher 12. The flange has a recess 18 for locating the gear at station II, where it is gripped by jaws 10 and lifted upwardly, perpendicularly to the plane of FIG. 1, then moved laterally to station III and there moved downwardly, again perpendicularly to the plane of FIG. 1. This downward motion at station III places the blank on workholder 21, which as shown in FIG. 2 is mounted on work spindle 22 of a gear cutting machine, the rotation axis of the spindle being designated 23.

While jaws 10 by their upward, lateral and downward motions thus transfer a blank G from station II onto the workholder at station III, the jaws 11 by like and simultaneous motions remove from the workholder a gear G in which the teeth have been cut at station III and place it on a support plate 24, station IV, which is essentially like plate 15–18. Simultaneously with the lateral motion, the pusher 13 rolls a previously cut gear from station IV to a fifth station, not shown, which may be a magazine like 14 or other suitable gear receptacle, or a conveyor for carrying the gear to a finish cutting machine.

The mechanism for carrying out the above described motions comprises a slide 25 movable laterally back and forth, along guide rods 26 of a stationary frame 27, by means of a piston 28 reciprocable in a hydraulic cylinder 29 on the frame. The stroke of the piston is equal to the distance between adjacent stations I and II, II and III, and III and IV. Pushers 12, 13 are secured to the slide 25. Also affixed to the slide are guide rods 31, parallel to axis 23, for a carriage 32 to which the jaws 10 and 11 are pivoted by pins 33. The carriage, together with the jaws pivoted to it, is raised and lowered along the guide rods by means of a hydraulic cylinder 34, secured to the carriage, acting against its piston 35 whose rod 36 is secured to slide 25. The jaws are actuated, to grip or release a gear blank, by pistons 37 reciprocable in hydraulic cylinders 38 on the carriage. A cross-head on the rod of each piston 37 has inclined guide slots 39 for rollers 41 on the jaws, which are therefore opened upon downward movement of the pistons and closed upon upward movement of the pistons.

The mechanism, insofar as described above with the aid of reference numerals, is substantially the same as that disclosed in aforementioned Patent No. 3,169,446. However, referring to FG. 3, the gear blanks are not of ring gear form as in the patent, but are of the kind having a back hub with outer cylindrical surface 42, central bore 43, front counterbore 44, and a circle of equally spaced bolt holes 45. When a blank G is placed on workholder 21, its bore 43 telescopes over and is centered by the nose section 46 of the workholder actuating rod 47, which is operated by a hydraulic piston, not shown, in a cylinder either within or secured to work spindle 22. A split collet 48 has a bore 49 which contracts to grip the hub surface 42 when the actuating rod is drawn downwardly, the action being that the shoulder 51 on the rod draws the collet downwardly so that the mating conical surfaces 52 and 53 of the collet and workholder coact to contract the collet. The downward motion of the collet while it is contracting acts to draw the back face of the blank firmly against the raised surfaces 54 on the front face of the workholder.

Figure 4:
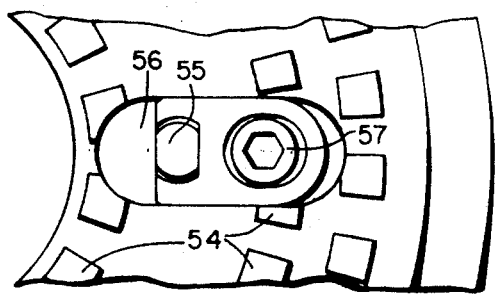
FIG. 4 is an enlarged section in plane 4—4 of FIG. 3.

Spiral bevel gear teeth of right hand spiral, as shown on the gear G at station IV, are cut in the blank by a face mill cutter, at station III, whose blades in cutting pass from the radially inner end to the outer end of the tooth slot being cut, i.e. in a clockwise direction as the cutter would appear if it were shown in FIG. 1. Consequently in the cutting action tends to turn the blank clockwise in the workholder (in the case of a gear with teeth of left hand spiral the cutter rotation and the tendency to turn the blank would be counterclockwise). When the chucking surface 42 is of relatively small diameter, as in the case illustrated, the holding torque of the workholder is usually insufficient to prevent such turning. Consequently in such cases the workholder is provided with a torque-bearing key which is engageable in a keyway provided in the gear blank. In the illustrated case one of the bolt holes 45 conveniently constitutes such a keyway, while the torque-bearing key on the workholder comprises a pin 55 secured in a radial slot 56 in the workholder by means of a screw 57. Preferably, to protect the key 55, a longer guide pin, 58, is engageable with another bolt hole 45 of the blank. Both pins 55 and 58 are of smaller diameter than the bolt holes, to provide reasonable clearance to accommodate machining and transfer mechanism alignment tolerances. However, by adjustment along radial slot 56, FIGS. 3 and 4, pin 55 rather than pin 58 is made to contact the blank when the latter, centered on nose section 46, is rotated on the workholder prior to work-gripping contraction of the collet 48.

Figure 5:
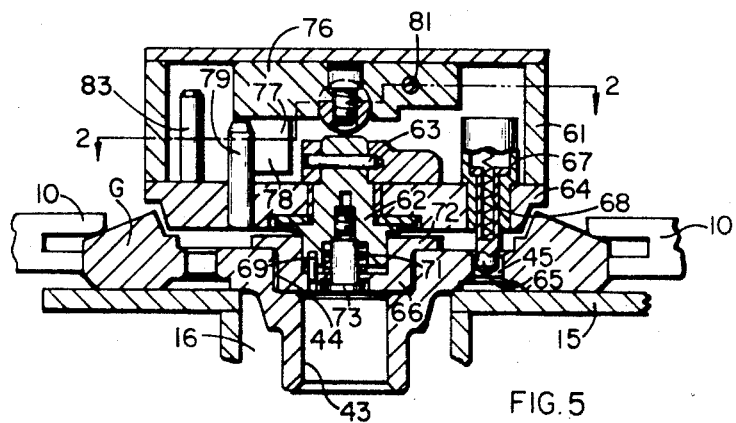
FIG. 5 is a section in plane 5—5 of FIG. 4.

For carrying out the purposes of the present invention the carriage 32 is provided with an extension 61 to which a stub shaft 62, FIGS. 3 and 5, is secured by pin 63, the shaft supporting for rotation thereon a driver disc 64. This disc carries a retractable pin 65 for entry, with clearance, into a bolt hole 45 of the gear blank, and a centering member 66 for entry, with slight clearance, into counterbore 44 of the blank as the carriage 32, 61, lowers upon a blank at station II. The pin 65 is slidable in a sleeve 67 secured to the disc 64 and is backed by a spring 68. Thus the pin can retract should it not register with a bolt hole 45 as the carriage lowers, and will subsequently extend into one of the bolt holes under spring pressure when it comes into alignment with the hole by reason of rotation of the disc 64. The centering member 66 is held against rotation on shaft 62 by a pin 69 and is pressed downwardly, axially of the shaft, by a spring 71 to an extent limited by abutment of its flange 72 with the front face of the gear blank (or by abutment with the head of a retainer screw 73 when it is not engaged with a blank). The spring 71 presses the centering member 66 against the blank, to frictionally hold the blank against turning on support 15 when disc 64 is rotated prior to pin 65 entering a bolt hole 45, and thereafter to brake the rotation of the blank.

Rotation of the disc 64 is effected by a piston 74, FIG. 2, reciprocable by hydraulic pressure in a cylinder 75 in carriage extension 61. A cross-head 76 secured to rod 77 of the piston has a furcation 78 straddling a pin 79 carried by driver disc 64. The up stroke of piston 74 is limited by abutment of adjustable stop screw 81 on the cross-head with stop 82 on extension 61, while the down stroke is limited by abutment of a pin 83 on disc 64 with adjustable stop screw 84 on the extension 61. The pin 83 is shown in broken lines in the abutting position. Stop screws 81 and 84 are so adjusted that during the down stroke the disc 64 is turned counterclockwise through an angle slightly greater than the spacing of bolt holes 45, assuring that pin 65 will enter one of the holes, and that in the terminal position of the down stroke two other bolt holes 45 will be in position to register with pins 55 and 58 when the transfer mechanism is subsequently operated to carry the blank to the workholder at station III.

In operation, when the carriage 32 is lowered, the centering member 66 enters counterbore 44 of the gear blank at station II. Then, by pressure applied to the upper end of cylinder 75, the piston 74 is moved downwardly, rotating the driver disc counterclockwise. The pin 65 enters in bolt hole 45 and turns the gear counterclockwise in the recess 18 and on centering member 66 to position two of the bolt holes 45 to subsequently register with pins 55, 58, FIG. 3. The pistons 37 are actuated to close the jaws 10, 11, the collet 48 is actuated to release the gear at station III, and by operation of pistons 35 and 28 the gear at station III is transferred to station IV and the blank at station II is placed on the workholder at station III.

The jaws 10, 11 are then opened, and pressure is applied to the lower end of cylinder 75, rotating the driver disc 64 and pin 65 clockwise until the blank has been turned through the small angle which takes up the clearance between the pin 55 and the surface of the bolt hole 45 in which it is entered, i.e. the angle which brings the surface of bolt hole into torque-bearing abutment with the pin. Then the collet 48 is actuated to clamp the gear blank, the pressure against the lower face of piston 74 is released, and by actuation of pistons 35, 28, the jaws are returned to their elevated positions above stations II and III, and cutting of the blank at station III is begun. Since the blank has now been turned clockwise as far as the pin 55 will allow, the cutting forces tending to turn it clockwise on the workholder will be borne by the pin, without any further angular displacement of the blank on the workholder. Prior to the next gear blank loading cycle pressure is again applied against the lower face of piston 74, continuing the clockwise rotation of the driver disc 64 which terminates upon abutment of stops 81, 82.

It will be understood that the operation of the several pistons in the order described above is effected by valves controlled by an automatic sequencing system, such systems being well known in the art. For handling gear blanks whose teeth are to be of left hand spiral, so that the cutting forces are reversed, the hydraulic connections to the upper and lower ends of cylinder 75 are reversed, or, preferably, the arrangement of the stops 81–84 is made of opposite hand, so that before being clamped the gear blank will be turned clockwise into torque-bearing abutment with key 55.

Having now described a preferred embodiment of our invention, what we claim is:

1. A mechanism for loading a gear or like workpiece which has at least one keyway, onto a workholder which has a key for engagement with such keyway, comprising a support on which a workpiece is rotatable, a transfer device adapted to receive the workpiece from the support and place it on the workholder, a driver rotatable relative to said device about an axis corresponding to the axis of a workpiece gripped by said device, a drive pin carried retractably by the driver, the drive pin being extensible into a keyway of the workpiece upon being aligned therewith by rotation of the driver, and means for rotating the driver to first effect such alignment and then to rotate the workpiece into the angular relation to the transfer device in which a keyway of the workpiece will register with the key of the workholder.

2. A mechanism according to claim 1 in which the support has a locating recess in which the workpiece is rotatable about its axis while in position to be gripped by the transfer device.

3. A mechanism according to claim 1, for a workpiece having a centering surface of revolution about its rotation axis, in which the driver has a centering formation registerable with said surface.

4. A mechanism according to claim 1 in which said driver and said means for rotating it are mounted on said transfer device.

5. A mechanism according to claim 4 in which pressure exerting means are provided on the driver for pressing the workpiece against the support.

6. A mechanism according to claim 4 in which said means for rotating the driver is arranged to rotate the driver through a predetermined angle in one direction to bring the workpiece into said angular relation to the transfer device and subsequently, after the workpiece has been placed on the workholder, to rotate the driver in the opposite direction to establish torque-bearing abutment between a key of the workholder and the keyway of the workpiece that is in register therewith.

7. A mechanism according to claim 6 in which spring means are arranged to act between the driver and the workpiece, in a direction axial of the workpiece, for pressing the latter against the support.

8. A mechanism according to claim 6 in which said transfer device comprises a carriage having a pair of work-gripping jaws pivoted thereto and means for actuating said jaws, and the driver and said means for rotating it are mounted on said carriage.

9. A mechanism according to claim 8 in which said carriage is reciprocable relative to the workholder in the direction of the workholder axis, for placing a workpiece on the workholder and removing it therefrom, and is also reciprocable in a direction perpendicular to the workholder axis to carry a workpiece from said support to a position wherein it is axially aligned with the workholder.

10. A mechanism according to claim 8 in which the means for rotating the driver comprises a piston having a cross-head with a guideway therein transverse of the axis of the piston, and a pin on the driver eccentric of the rotation axis of the driver and engaged in said guideway.

11. A mechanism according to claim 10 in which there are abutting stops, one of which is adjustable, on the driver and on the support, for limiting rotation of the driver during which the drive pin enters a keyway of the workpiece, and other abutting stops for limiting return rotation of driver.

References Cited

UNITED STATES PATENTS 3,075,651  1/1963  Kaden _____ 214—1
3,169,446  2/1965  Anderson _____ 214—1 X GERALD M. FORLENZA, Primary Examiner GEORGE F. ABRAHAM, Assistant Examiner U.S. Cl. X.R.
29—159.2; 198—19